US006244750B1

United States Patent
Chiang

(10) Patent No.: US 6,244,750 B1
(45) Date of Patent: Jun. 12, 2001

(54) CRANK AXLE ASSEMBLY FOR A BICYCLE

(76) Inventor: Douglas Chiang, 487, Ko-Chung Rd., Ta-Li City Taichung Hsien (TW)

( * ) Notice: Subject to any disclaimer, the term of this patent is extended or adjusted under 35 U.S.C. 154(b) by 0 days.

(21) Appl. No.: 09/432,780

(22) Filed: Nov. 3, 1999

(51) Int. Cl.[7] .............................. F16C 9/02; B02K 19/34
(52) U.S. Cl. ......................... 384/545; 384/458; 384/540
(58) Field of Search ................................. 384/545, 544, 384/538, 540, 571, 457, 458, 589; 74/594.2

(56) References Cited

U.S. PATENT DOCUMENTS

| | | | |
|---|---|---|---|
| 5,405,202 | * 4/1995 | Chi | 384/545 |
| 5,549,396 | 8/1996 | Chiang | 384/545 |
| 5,572,909 | * 11/1996 | Chi | 74/594.1 |
| 6,139,192 | * 10/2000 | Chiang | 384/545 |

* cited by examiner

*Primary Examiner*—Thomas R. Hannon
(74) *Attorney, Agent, or Firm*—Bacon & Thomas, PLLC

(57) ABSTRACT

A bicycle crank axle comprises an axle, which is provided with two fitting portions located at both ends thereof. Each of the two fitting portions is fitted into a tapered sleeve, which is in turn fitted into a fixation seat. The fixation seat is provided with a tapered center hole in which a tapered fixation ring, a tapered bearing seat, a C-shaped ring, a pillar holder of a tapered construction, a plurality of tapered pillars, a washer, and a fixation seat cover are provided. The tapered pillars are intimately held by the pillar holder to provide the axle with protection against idle running and mechanical wear.

3 Claims, 5 Drawing Sheets

CRANK AXLE ASSEMBLY FOR A BICYCLE

FIELD OF THE INVENTION

The present invention relates generally to a bicycle crank axle, and more particularly to a bicycle crank axle, which can be easily assembled with precision.

BACKGROUND OF THE INVENTION

FIG. 1 shows a schematic view of a bicycle crank axle 10 which is disclosed by this inventor of the present invention in the U.S. Pat. No. 5,549,396. The bicycle crank axle 10 is provided at both ends thereof with a tapered sleeve 20, and a tapered bearing 30 which is fitted over the tapered sleeve 20 and is engaged with a tapered fixation seat 31.

Such a bicycle crank axle 10 as prior art described above is susceptible to idle running in view of the tapered bearings 30 which do not work well with the steel balls or the non-tapered frame tube. In addition, the crank axle 10 is vulnerable to wear.

SUMMARY OF THE INVENTION

The primary objective of the present invention is to provide a bicycle crank axle which is free from the deficiencies of the prior art bicycle crank axle described above.

In keeping with the principle of the present invention, the forgoing objective of the present invention is attained by a bicycle crank having two fitting portions located respectively at both ends thereof. The two fitting portions are provided with a tapered sleeve, which is provided at the small diametrical end thereof with a fixation seat, and at the large diametrical end thereof with a tapered ring and an oil seal. The fixation seat is provided therein with a tapered fixation ring, a tapered bearing seat, a C-shaped ring, a rolling pillar holder of a tapered construction, a plurality of rolling pillars of a tapered construction, a washer, and a cover. The fixation seat prevents the idle running and the mechanical wear of the bicycle crank axle.

The foregoing objective, features, functions, and advantages of the present invention will be more readily understood upon a thoughtful deliberation of the following detailed description of a preferred embodiment of the present invention with reference to the accompanying drawings.

DETAILED DESCRIPTION OF THE PREFERRED EMBODIMENT

Figure 1:
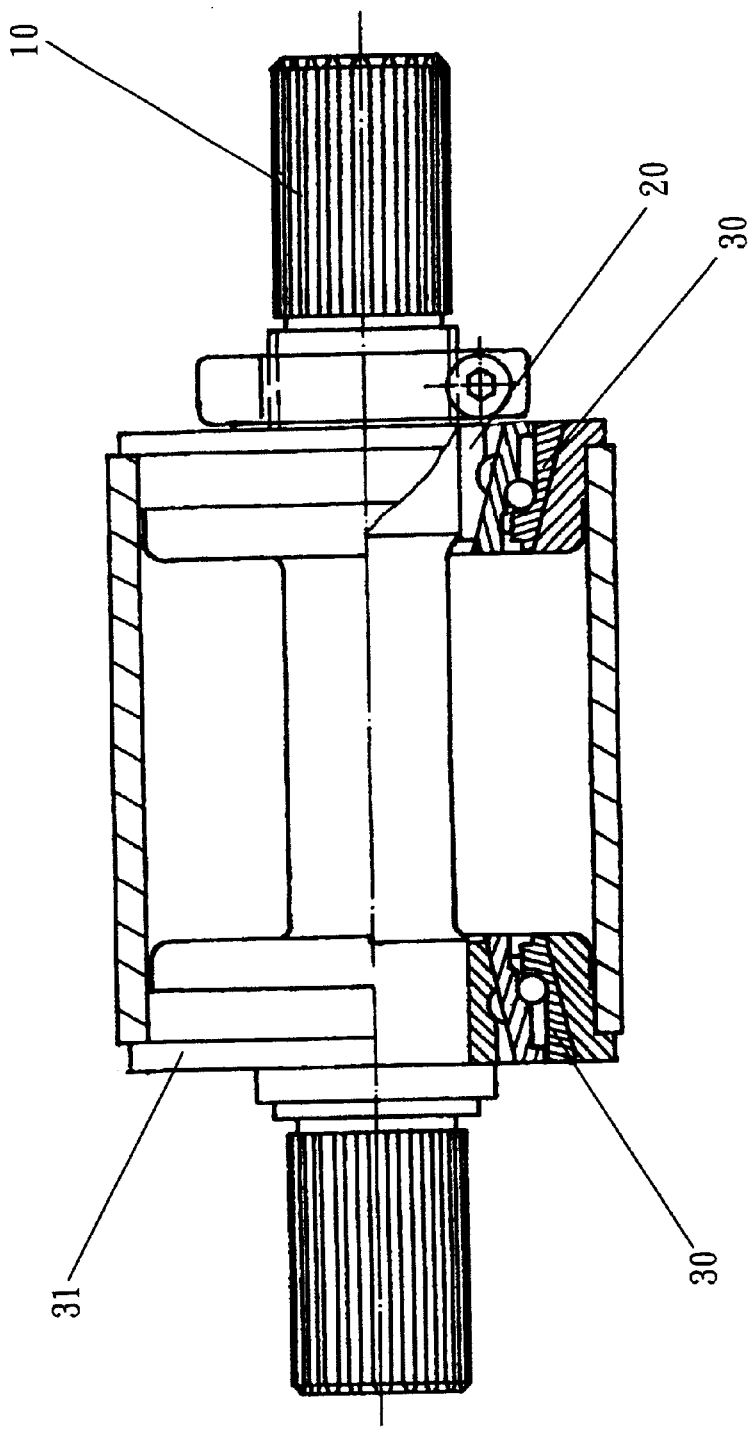
FIG. 1 shows a sectional schematic view of a bicycle crank axle of the prior art.
Figure 2:
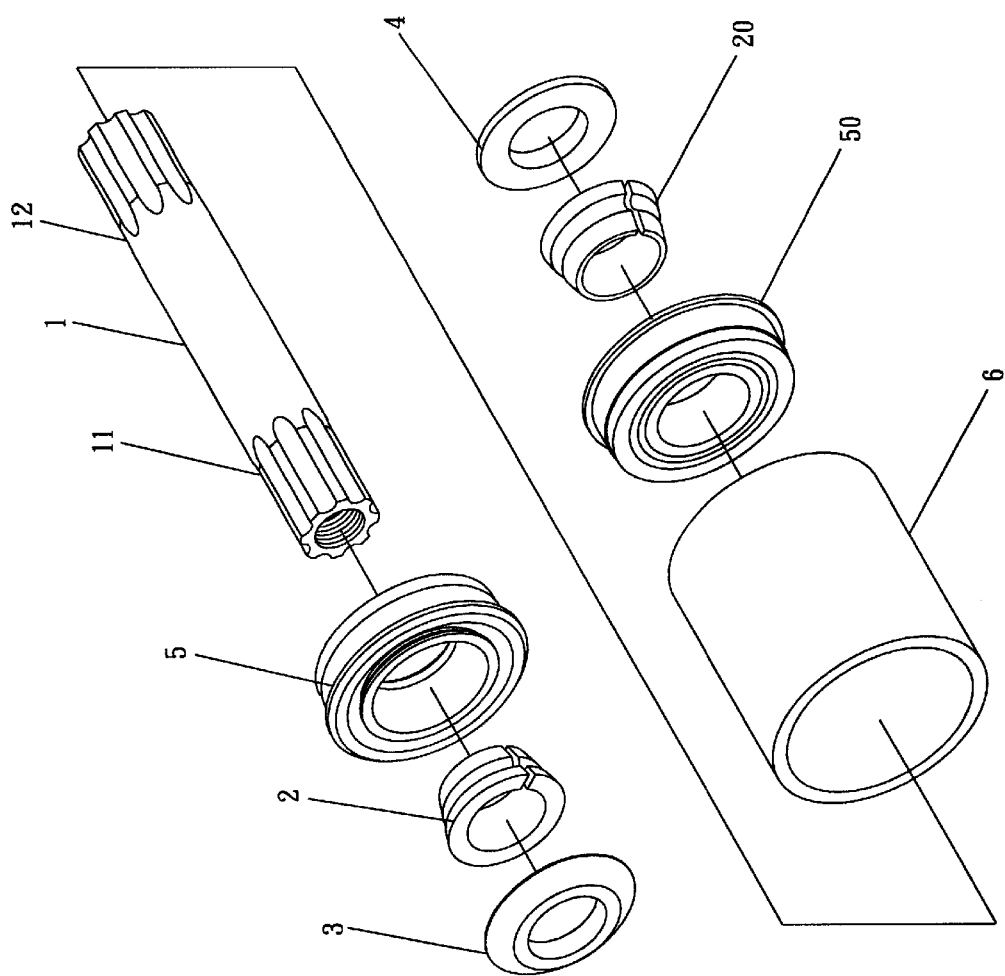
FIG. 2 shows an exploded view of a bicycle crank axle of the preferred embodiment of the present invention.

As shown in FIGS. 2–5, a bicycle crank axle embodied in the present invention comprises an axle 1 which is provided at one end thereof with a first fitting portion 11, and at other end thereof with a second fitting portion 12. The first fitting portion 11 is provided with a first tapered sleeve 2 fitted thereover such that the first tapered sleeve 2 is fitted into a first fixation seat 5 in conjunction with a tapered ring 3. The second fitting portion 12 of the axle 1 is provided with a second tapered sleeve 20 fitted thereover such that the second tapered sleeve 20 is fitted into a second fixation seat 50 in conjunction with an oil seal 4. The axle 1 is fitted into a frame tube 6.

Figure 3:
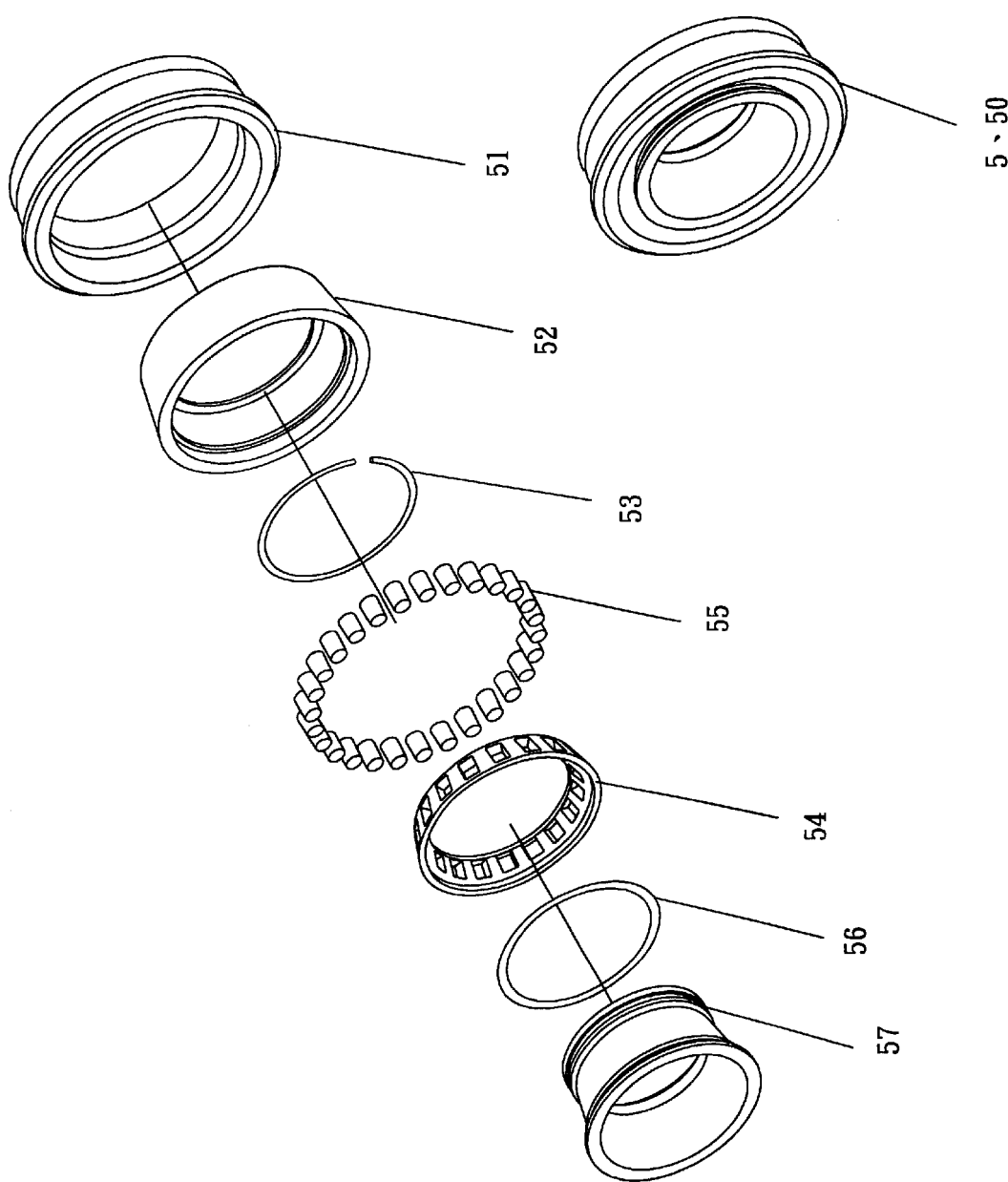
FIG. 3 shows an exploded view of a fixation seat of the bicycle crank axle of the preferred embodiment of the present invention.
Figure 4:
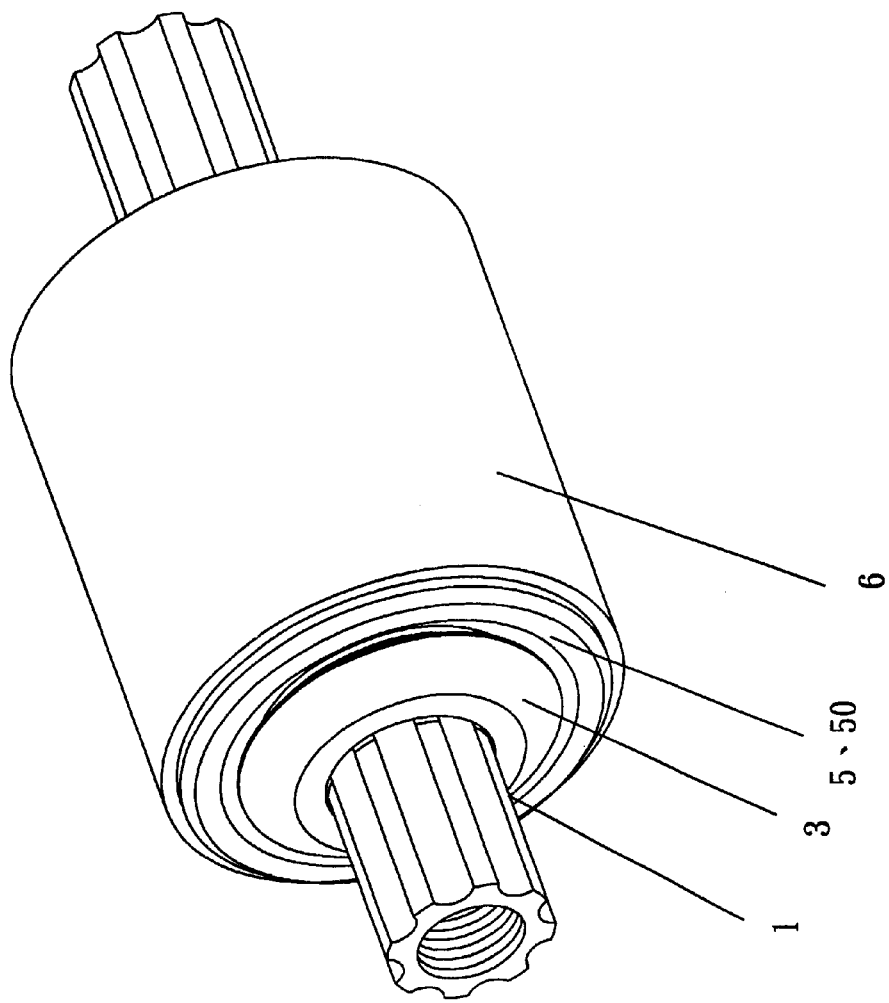
FIG. 4 shows a perspective view of the bicycle crank axle of the preferred embodiment of the present invention in combination.
Figure 5:
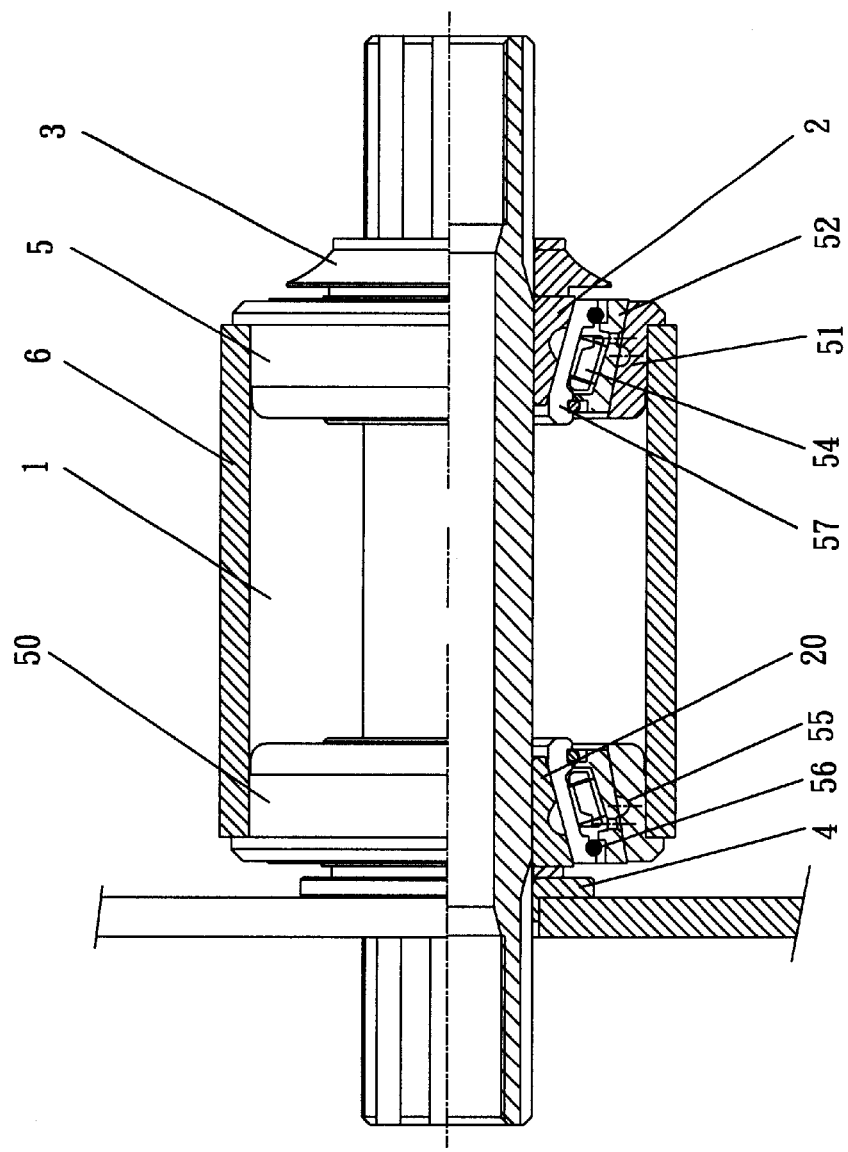
FIG. 5 shows a longitudinal sectional view of the bicycle crank axle of the preferred embodiment of the present invention in combination.

As shown in FIG. 3, the first fixation seat 5 and the second fixation seat 50 are similar in construction to each other. For this reason, only the structure of the second fixation seat 50 will be described with reference to FIG. 3. The second fixation seat 50 has a tapered center hole into which a tapered fixation ring 51, a tapered bearing seat 52, a C-shaped ring 53, a rolling pillar holder 54 of a tapered construction, a plurality of tapered pillars 55 in cooperation with the rolling pillar holder 54, a washer 56, and a fixation seat cover 57 are fitted. The tapered pillars 55 are intimately held by the rolling pillar holder 54, thereby preventing the axle 1 from idle running and providing the axle 1 with protection against mechanical wear. The service life span of the bicycle crank axle of the present invention is thus prolonged effectively.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claims.

What is claimed is:

1. A crank axle assembly comprising:
   a) an axle having a first fixing portion at a first end and a second fixing portion at a second end thereof;
   b) a first fixation seat assembly mounted on the first fixing portion and a second fixation seat assembly mounted on the second fixing portion;
   c) a first tapered sleeve and a tapered ring disposed adjacent the first fixation seat assembly, and a second tapered sleeve and an oil seal disposed adjacent the second fixation seat assembly; and
   d) each of the first and second fixation seat assemblies including a fixation seat having a tapered center hole formed therein, a tapered fixation ring disposed within the tapered center hole, a C-shaped ring, a rolling pillar holder, a plurality of rolling pillars engaged by the pillar holder, a washer and a fixation seat cover.

2. The axle assembly of claim 1 wherein the pillar holder and the pillars are of a tapered configuration.

3. The axle assembly of claim 2 further including a frame tube surrounding the axle and having a pair of ends engaged by the first and second fixation seat assemblies.

* * * * *